(12) United States Patent
Rosengard

(10) Patent No.: US 6,564,241 B1
(45) Date of Patent: *May 13, 2003

(54) AVIONIC COMPUTER SOFTWARE INTERPRETER

(75) Inventor: Phillip I. Rosengard, Sterling, VA (US)

(73) Assignee: L-3 Communications Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/645,988

(22) Filed: May 14, 1996

(51) Int. Cl.[7] ................................ G06F 9/00
(52) U.S. Cl. .......................... 709/107; 434/29
(58) Field of Search .................... 345/702, 703, 345/709; 434/29–35; 364/580, 424; 709/107, 310; 703/22

(56) References Cited

U.S. PATENT DOCUMENTS

| 4,658,359 A | * | 4/1987 | Palatucci et al. | |
|---|---|---|---|---|
| 5,541,863 A | * | 7/1996 | Magor et al. | |
| 5,546,562 A | * | 8/1996 | Patel | 395/500 |
| 5,579,512 A | | 11/1996 | Goodrum et al. | |
| 5,807,109 A | * | 9/1998 | Tzidon et al. | |

FOREIGN PATENT DOCUMENTS

| EP | 0 168 034 A | | 1/1986 | |
|---|---|---|---|---|
| EP | 0 327 197 A | | 9/1989 | |
| EP | 327197 | * | 9/1989 | G06F/9/44 |
| WO | WO 95 2600 | | 9/1995 | |

OTHER PUBLICATIONS

Em–Gyung Kim, A Study on Developing a Distributed Problem Solving System, Compsal '95, IEEE, p. 122–127, Sep. 1995.*

Peter Magnusson, Bengt Warner, Efficient Memory Simulation in SIM ICS, Simulation Symposium 195, IEEE, p. 62–723, Apr. 1995.*

Bertke et al, "the use of timing simulation in Air Force Integrated Avionics", IEEE, 1991, pp. 320–331.*

(List continued on next page.)

*Primary Examiner*—Sue Lao
(74) *Attorney, Agent, or Firm*—Andrew L. Tiajoloff

(57) ABSTRACT

A system and method for interpreting a plurality of sets of program instructions of an avionic flight computer are implemented on a general-purpose commercially available computer having multi-processing capabilities with a greater number of processors than the avionics computer. The system and method include assigning each of the avionic computer processors to a corresponding one of the processors on the commercial computer and loading each set of program instructions into one of a plurality of cache memories each associated with one of the commercial computer processors. The system and method further include executing a shared process including the interpreter instructions on each of the commercial computer processors associated with one of the avionics computer's processors. Each shared process interprets only those program instructions intended for its associated processor. The system and method also execute an additional shared process on an additional one of the commercial computer processors not already assigned to one of the avionic computer processors. The additional shared process controls input/output and interrupt requests generated by each of the other commercial computer processors.

36 Claims, 5 Drawing Sheets

OTHER PUBLICATIONS

Lebeck et al; "Active memory: a new abstraction for memory–system simulation", ACM, 1995, pp. 220–230.*

Van Fleet et al. "Automated validation of operational flight programs and fight training simulators", IEEE, 1994, pp. 1006–1013.*

Liberman, David, DEC's RISC plan begins with Alpha, Electronic Engineering Times, pp. 1–3, Dec. 2, 1991.*

Brown, Bruce, Full Power: Buying the maximum PC. Computer Shopper, pp. 1,10–11, Sep. 1993.*

Kin F. Li, et al., "An Emulated Environment for Studying Distributed Systems", IEEE Pacific Rim Conference on Communications, Computers and Signal Processing, Jun. 1–2, 1989, Victoria, BC, CA, pp. 273–276.

S. Raskin, et al., "Emulation of a Communication System Network on a Host Computer", Motorola Technical Developments, vol. 17, Dec. 1992, Schaumburg, IL, US, pp. 21–23.

* cited by examiner

AVIONIC COMPUTER SOFTWARE INTERPRETER

TECHNICAL FIELD

The present invention relates to a system and method for interpreting avionic computer programs using software generated by a high-level programming language.

BACKGROUND ART

Modern aircraft rely on special purpose avionic computers to facilitate pilot control of operation and navigation functions. In military applications, control of weapons is also integrated into the avionics computer. Each computer is programmed with an Operational Flight Program (OFP) which may be periodically revised based on actual flight experience or changes to the aircraft or weapons. In addition, each aircraft may have a number of OFP's which correspond to various missions. A number of military air vehicle platforms, including the F/A-18 aircraft and the LAMPS Mk III helicopter use one or more of the AN/AYK-14 16-bit general purpose avionics minicomputers. While characterized as a general purpose flight computer, this computer is specified by the United States Navy and includes a non-standard backplane, non-standard cards, and a non-standard microprocessor and support chips. Thousands of these computers are in use around the world.

Because the life of the pilot (and crew, if any) relies on the proper performance of these aircraft, and that the replacement cost may range between $30 million and $50 million each, it is desirable to train the pilots prior to their first flight. An essential part of training includes sophisticated flight simulators which attempt to produce the same response to the pilot's actions as the actual aircraft would produce in flight. An inaccurate response generated by the simulator may be detrimental to the pilot and the aircraft when in actual flight. Thus, simulators undergo intensive validation to assure that they accurately simulate actual in-flight performance. If the OFP is changed, it is often necessary to revalidate the simulators.

For military applications, two types of simulators may be utilized. Operational Flight Trainers (OFT) are used to gain basic operational skills with the aircraft while Weapons Tactics Trainers (WTT) are used to acquire weapons and tactics skills. Both types of simulators must be validated and often revalidated for each revision to the OFP. Unfortunately, revalidation may require a significant period of time. While it is desirable to rapidly implement OFP updates in simulators so pilots receive the most timely training, it is also desirable that updates will be accurately simulated in the simulators.

One approach to designing and building a flight simulator is to incorporate the same avionics computer into the simulator while emulating the response of various input and output hardware, such as sensors, switches, lights, and the like. Validation of this approach may be advantageous in that the avionics computer used in the simulator is the same as that used in the aircraft. As such, validation is limited to the input and output device emulation. However, due to the non-standard components used in the AN/AYK-14, the interface hardware must be custom designed and manufactured and is burdened by the associated costs. Furthermore, avionics computers continue to become more expensive, more complex, and harder to integrate into simulators. As such, this approach is no longer desirable.

Another approach to designing and building a flight simulator is to port the OFP source code to a different computer platform by recompiling and modifying all of the hardware dependent or compiler dependent code. This is a manpower intensive process which creates a large operations overhead cost. Further, porting assembly language code (i.e. low-level code) to a commercial high-level language (such as "C") is a time consuming, programmer intensive process prone to the introduction of translation errors which reduce the validity of the simulator. As such, this approach requires revalidation of the OFP in the simulator for each OFP revision.

Yet another approach to creating a flight simulator is to construct a hardware reproduction of the avionics computer. For the AN/AYK-14, this approach is undesirable because its instruction set architecture is not based upon any commercially available microprocessor or chip set. As such, costly, custom hardware development would be required.

Alternatively, an embedded, bare machine hardware emulation using commercial hardware with no operating system could be constructed. This approach requires extensive and costly low level, assembly programming to attain the instruction execution speed of the actual avionics computer. Assembly or machine level software is also microprocessor specific and therefore not portable to other computers. Further, microprocessor hardware features are used to emulate target architectural machine features, including memory map and real time clock, to attain sufficient operational speed. Consequently, moving the emulation to another microprocessor with different hardware implementations of memory mapping and times requires these portions of the bare board emulator to be replaced, and is therefore undesirable.

A translator which performs off-line translation of the avionics computer assembly language into a high-level language, such as "C" can typically process only ¼ to ½ of the input assembly code of the OFP. The remaining instructions must be hand translated. This is a costly and time consuming process which requires revalidation of the OFP and is also undesirable.

A functional simulator replaces both the flight hardware and software with hand coded software based on documentation provided by the hardware and software developer of the system being simulated. To make this solution cost competitive, various shortcuts are usually taken which limit the fidelity of the model. The reduced fidelity directly conflicts with the need to maintain flight software validation and the associated, costly, programming effort.

DISCLOSURE OF THE INVENTION

It is thus an object of the present invention to provide a system and method for interpreting avionic computer programs which meets or exceeds the overall instruction throughput processing requirements for real-time OFP operation.

A further object of the present invention is to provide a system and method for interpreting avionic flight computer instructions using commercial off-the-shelf hardware and software technology.

A still further object of the present invention is to provide a software interpreter for the AN/AYK-14 avionics computer which reduces turn-around time between delivery of a new aircraft OFP and its installation into a flight simulator or trainer.

Yet another object of the present invention is to provide a system and method for interpreting avionic computer instructions which reduces the cost for installation of a new aircraft OFP into a flight simulator or trainer.

A still further object of the present invention is to provide a software interpreter which does not require revalidation of OFP modifications in the flight simulator.

In carrying out the above objects and other objects and features of the present invention, a system and method for interpreting a plurality of sets of program instructions of an avionic flight computer are provided. The avionics computer typically has plurality of processors which execute a corresponding one of the sets of instructions which form the OFP. The interpreter is implemented on a general-purpose commercially available computer also having multi-processing capabilities with a greater number of processors than the avionics computer. The system and method include assigning each of the avionic computer processors to a corresponding one of the processors on the commercial computer and loading each set of program instructions into one of a plurality of cache memories each associated with one of the commercial computer processors. The system and method further include executing a shared process including the interpreter instructions on each of the commercial computer processors associated with one of the avionics computer's processors. Each shared process interprets only those program instructions intended for its associated processor. The system and method also execute an additional shared process on an additional one of the commercial computer processors not already assigned to one of the avionic computer processors. The additional shared process controls input/output and interrupt requests generated by each of the other commercial computer processors.

The advantages accruing to the present invention are numerous. Because the present invention utilizes a high-level programming language and fully implements the avionics computer memory addressing system in software, it is independent of the particular hardware and is therefore portable among various commercial computer platforms. The system and method of the present invention can save significant cost by reducing hardware required for flight simulators and afford "drop-in" capability for various OFP's, i.e. no additional manual coding is required. By utilizing cache memory to store the OFP and associated data, the avionic computer virtual memory addressing system, and the software interpreter instructions the present invention can execute an AN/AYK-14 OFP in real-time for even the fastest available AN/AYK-14.

The above objects and other objects, features, and advantages of the present invention will be readily appreciated by one of ordinary skill in this art from the following detailed description of the best mode for carrying out the invention when taken in connection with the accompanying drawings.

BEST MODE(S) FOR CARRYING OUT THE INVENTION

Figure 1:
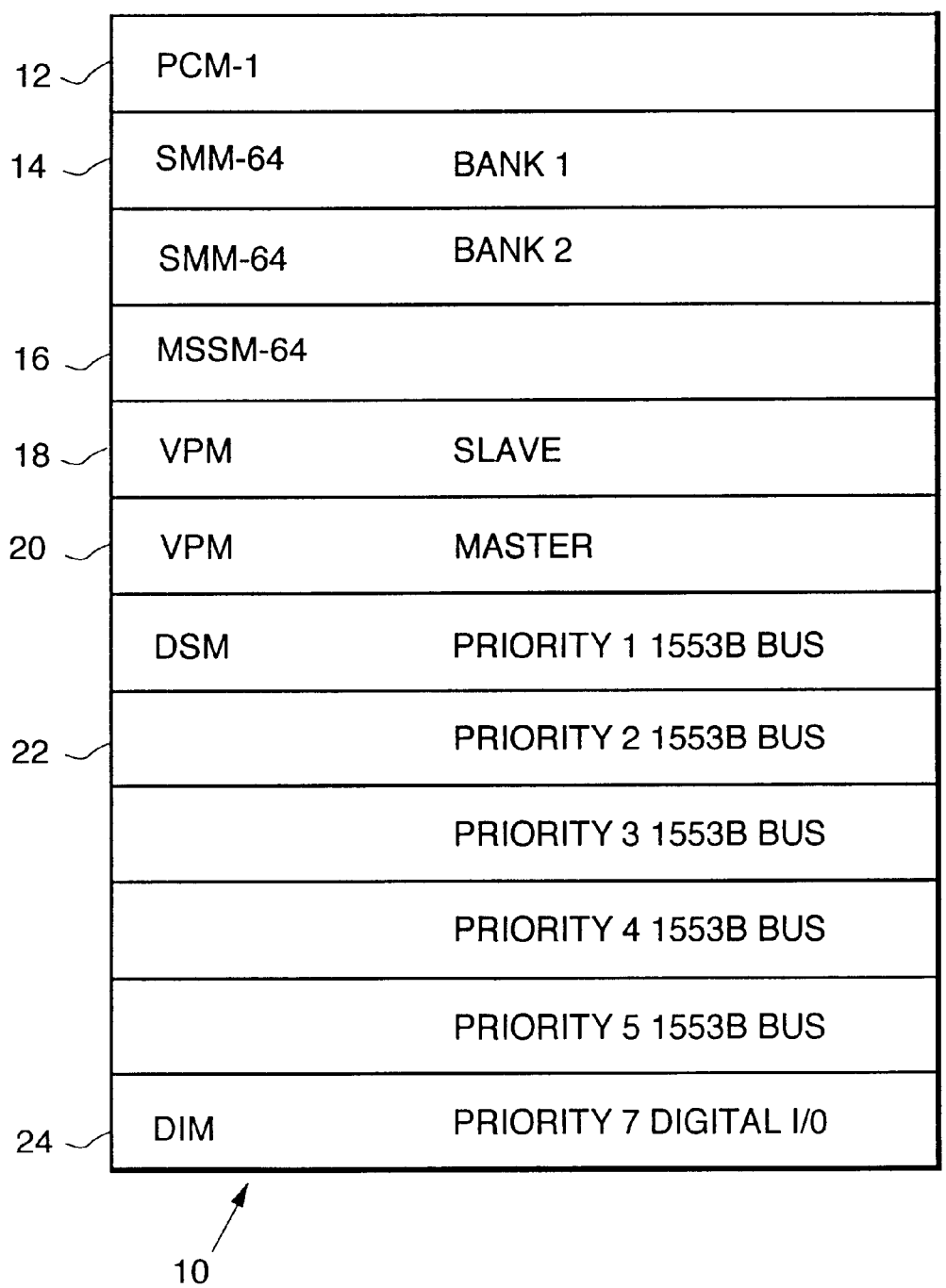
FIG. 1 illustrates a typical hardware configuration for the AN/AYK-14 avionics minicomputer for an F/A-18 XN-8 Mission Computer.

Referring now to FIG. 1, a block diagram illustrating the hardware configuration of an F/A-18 XN-8 Mission Computer (CP-2215) is shown. The various boards of the computer are housed within a common chassis 10 and communicate on a common backplane, not specifically illustrated. The boards include a Power Conversion Module (PCM) 12, two Semiconductor Memory Modules (SMM) 14, a Memory SubSystem Module (MSSM) 16, a Slave VHSIC Processor Module (VPM) 18 and a Master VPM 20, five Discrete Serial Modules (DSM) 22, and a Digital Interface Module (DIM) 24. The F/A-18 E/F uses a similarly configured avionic computer which includes an additional DSM board. This configuration of the AN/AYK avionics minicomputer uses the most advanced and fastest CPU (VPM) processors currently available. The VPM processors incorporate a non-backwards compatible virtual memory address mode known as Extended Memory Reach (EMR). It represents the culmination of three generations of hardware development which is capable of approximately 5.45 MIPS (million instructions per second).

A software interpreter according to the system and method of the present invention meets the speed requirements of the latest generation of the VPM module and consequently all of its predecessors. Since all the VPM's execute a superset of the GPM and SCP instruction set and virtual memory addressing, the software interpreter is applicable for all hardware generations of the AN/AYK-14 avionic computer. A software interpreter according to the present invention is preferably implemented by a commercially available multiprocessing computer, such as the CHALLENGE, POWER CHALLENGE, or ONYX computer systems available from Silicon Graphics Incorporated (SGI). These computer systems use the MIPS R4400 and successor microprocessors, such as the MIPS R10000, and support CPU clock frequencies up to 250 MHz or more. This allows for execution of a number of instructions of the software interpreter for each of the avionic computer instructions to implement the host simulator functions, virtual memory addressing, virtual input/output functions, and the like.

In a preferred embodiment of the present invention utilizing one of the above-referenced SGI computers with a clock frequency of 250 MHz, an average interpreter instruction to avionic computer instruction ratio of 50:1 is possible. A system or method in accordance with the teachings of the present invention requires an average ratio of only 25:1 to support a 10 MIP AYK-14, well in excess of the current 5.45 MIP throughput of the current generation of processors on these avionic computers.

Figure 2:
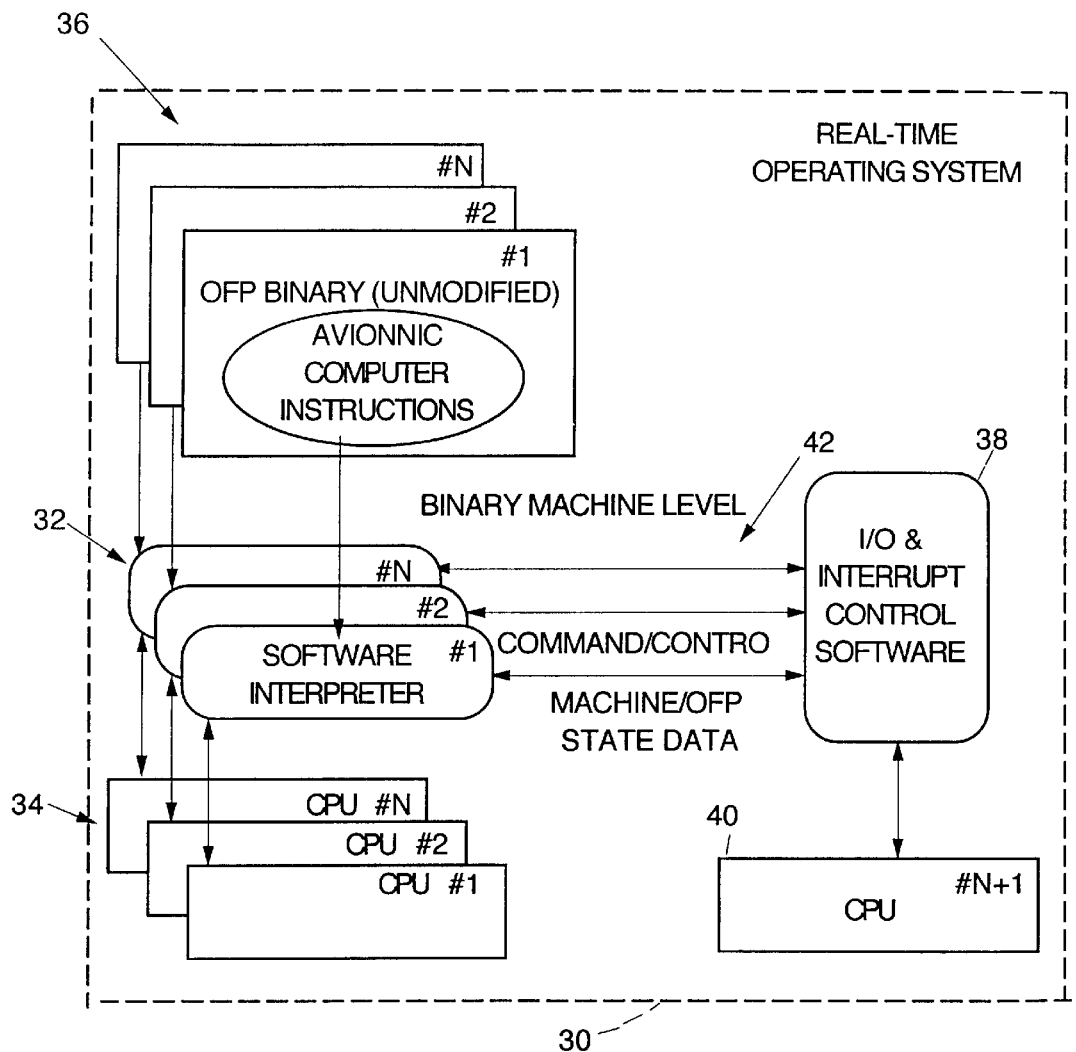
FIG. 2 is a block diagram of a commercially available computer platform for use in implementing an avionic computer software interpreter according to the present invention.

Referring now to FIG. 2, a block diagram illustrating elements of a software interpreter system and method according to the present invention is shown. The interpreter system, indicated generally by reference numeral 30, preferably runs as one or more normal user level tasks within a real-time operating system, such as the POSIX version of UNIX. Each software interpreter 32 is preferably implemented as a separate shared process (or thread) with multiple instructions which supports a single processor module with an associated OFP 36 of the avionic computer being simulated. Each software interpreter 32 is mapped to a single processor (CPU) 34 of the commercial computer and does not share that processor 34 with any other process or interrupt handler. For example, Slave VPM 18 and Master VPM 20 (illustrated in FIG. 1) would each have corresponding OFP's $36_1$ and $36_2$ and corresponding software interpreter processes $32_1$ and $32_2$ mapped to corresponding processors $34_1$ and $34_2$ in a commercially available multi-processing computer.

The software interpreters are preferably written in a high level programming language, such as "C" and designed to operate under real-time UNIX. This allows the interpreters to be easily ported between UNIX platforms without the necessity of recoding. The software interpreters can also be successfully ported to real-time operating systems, other than real-time UNIX, which support equivalent real-time UNIX features.

Instructions 38 for implementing interrupt control and input/output (I/O) functions are mapped to an additional processor 40. All interrupts on processors 34 are selectively inhibited and routed to instructions 38 for handling. Preferably, instructions 38 are implemented as an additional shared process executed by processor 40 which communicates with each of the software interpreter 32 processes. Instructions 38 implement a real time clock and handle all input and output requests generated by software interpreters 32. Also preferably, the I/O and real time clock state are communicated to software interpreters 32 as shared memory variables mapped directly into their shared process user address space, as indicated generally by reference numeral 42.

As illustrated in FIG. 2, the present invention allows an unmodified OFP 36, which includes the avionic computer instructions and data, to be directly loaded into the software simulator system 30. Preferably, the OFP's 36, software interpreters 32, and control software 38 are all loaded in cache memory as illustrated and described in greater detail with reference to FIGS. 3–5. Each software interpreter 32 preferably fully implements the memory addressing system of the avionic (target) computer as software. This provides portability unattainable in hardware emulators, or emulator/interpreter hybrids which depend upon a specific microprocessor memory management scheme to emulate the target memory system. In a preferred embodiment, the virtual memory is mapped to physical memory locations using a software interpreter translation look aside buffer (TLB). Memory addresses are right-hand or least-significant-bit (LSB) normalized by the TLB to improve the speed of address resolution since no bit shifting is required.

Figure 3:
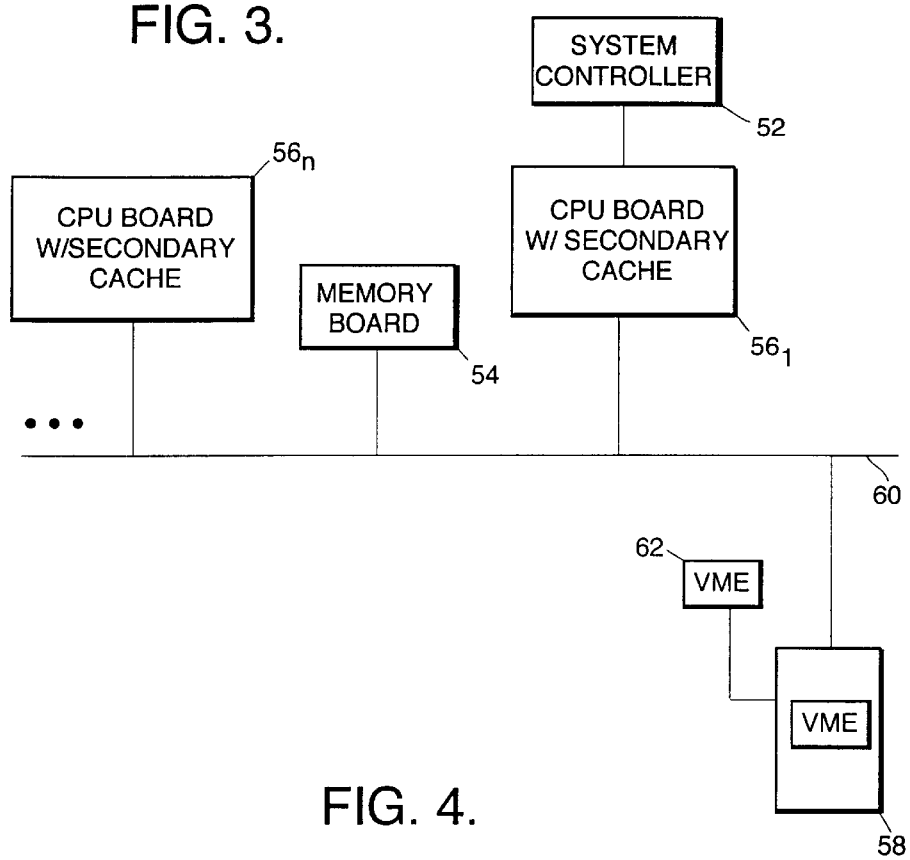
FIG. 3 is a block diagram illustrating a particular implementation of a system or method according to the present invention on a symmetric multiprocessing computer platform with separate system and input/output.

Referring now to FIG. 3, a system block diagram illustrating the architecture of one particular implementation of a system and method according to the present invention is shown. This implementation uses a symmetric multiprocessing computer platform 50 with separate system controller 52 and VME I/O controller 58 which communicates with VME devices 62. In such a system, memory 54 is a separate system shared among all the processors $56_1$ to $56_n$ which are connected to a common system bus 60. This feature, supported by the real-time UNIX operating system, allows all software processes to communicate with one another.

The high speed processors $56_1$ to $56_n$ use a large secondary cache, 4 MB or greater, to maintain maximum instruction execution speed. As long as the executing program remains in the cache, the CPU can execute instructions at it's maximum rated frequency, e.g. 250 MHz in the case of the R4400. If an instruction or data operand is not present within the cache when a CPU access is made, a memory request is initiated which reduces the operational frequency of the CPU by an order of magnitude. This is an unacceptable loss of performance for a software interpreter according to the present invention as it would execute at only a tenth of its required speed and may no longer be capable of executing an OFP at the rated avionic computer instruction rate. As such, the present invention loads the software interpreters and the OFP into cache memory to maintain the necessary instruction rate.

Figure 4:
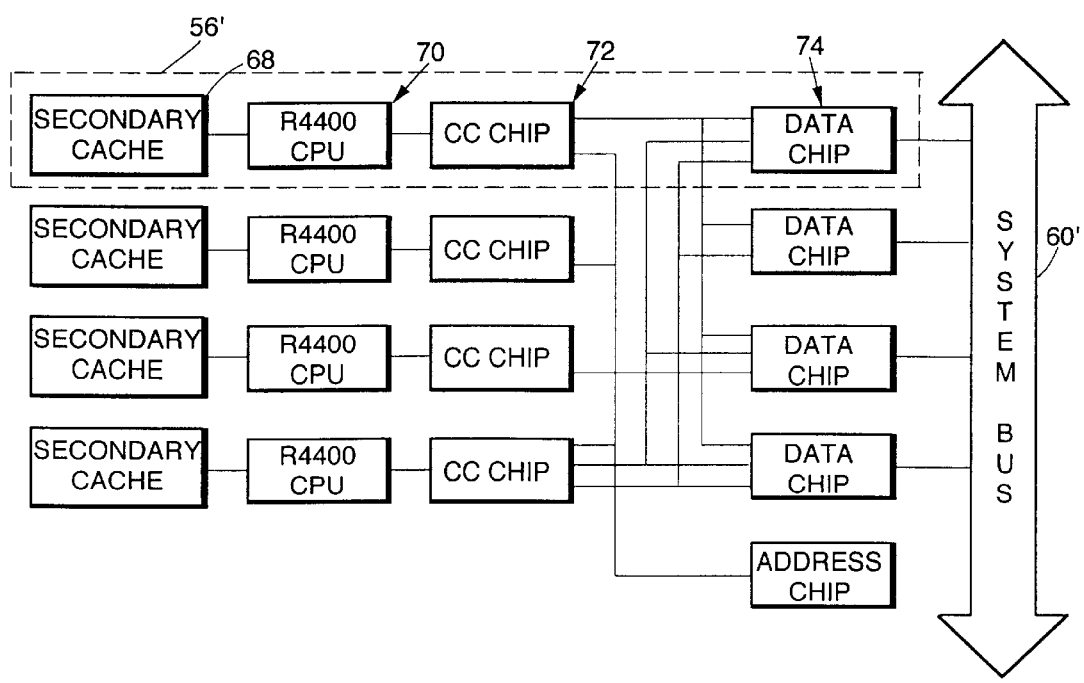
FIG. 4 is a functional block diagram illustrating additional details of the CPU board illustrated in FIG. 3.

Referring now to FIG. 4, a functional block diagram illustrating the connection of the processors to the memory system for the SGI CHALLENGE/ONYX computer is shown. Processor board $56_1$' includes secondary cache 68 which is in direct communication with the R4400 CPU 70. Cache-Coherence (CC) Chip 72 communicates with data chip 74 and address chip 76 to coordinate memory accesses over system bus 60'. In this embodiment, secondary cache 68 is a line cache. As such, if any data or instruction requested by R4400 CPU 70 is not present in cache 68 then only an equal amount of data and instructions in the cache are purged and replaced. Thus, the software interpreter and aircraft OFP should be maintained within cache 68 at all times to prevent or reduce a cache purge which would result in unsatisfactory system performance. In another embodiment, R4400 CPU 70 is replaced by an R10000 CPU with a 1 MB cache. Use of a multiple interleave addressing strategy in this embodiment results in an acceptable processing speed of about 80% of that attainable with a 4 MB cache memory.

Figure 5:
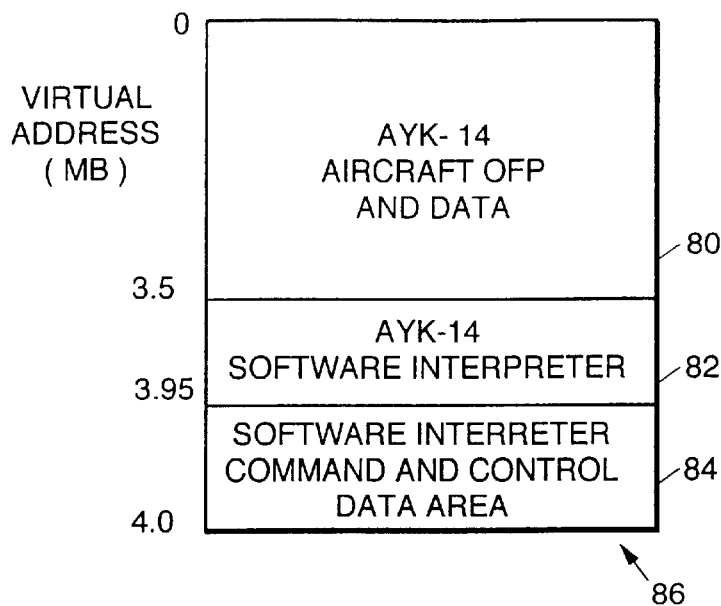
FIG. 5 illustrates a preferred organization of the software components in cache memory for a system and method according to the present invention.

Referring now to FIG. 5, a preferred organization of the software components within a cache memory for a system or method according to the present invention is shown. While this figure depicts a representative 4 MB unitary cache memory, other types and sizes of cache memories may be used without departing from the spirit or scope of the present invention. For example, the organization illustrated would apply equally well to a line unitary or line cache memory. As illustrated, the aircraft OFP 80, the software interpreter 82, and the software interpreter command and control data 84 are stored within cache memory 86, preferably in contiguous memory locations.

Because high level, standard operating system and language are used, there are no hardware microprocessor dependencies resulting in complete portability to any sufficiently fast symmetric multiprocessor system with a sufficiently large cache to contain both the software interpreter and aircraft OFP, or memory interleaving equivalent.

Figure 6:
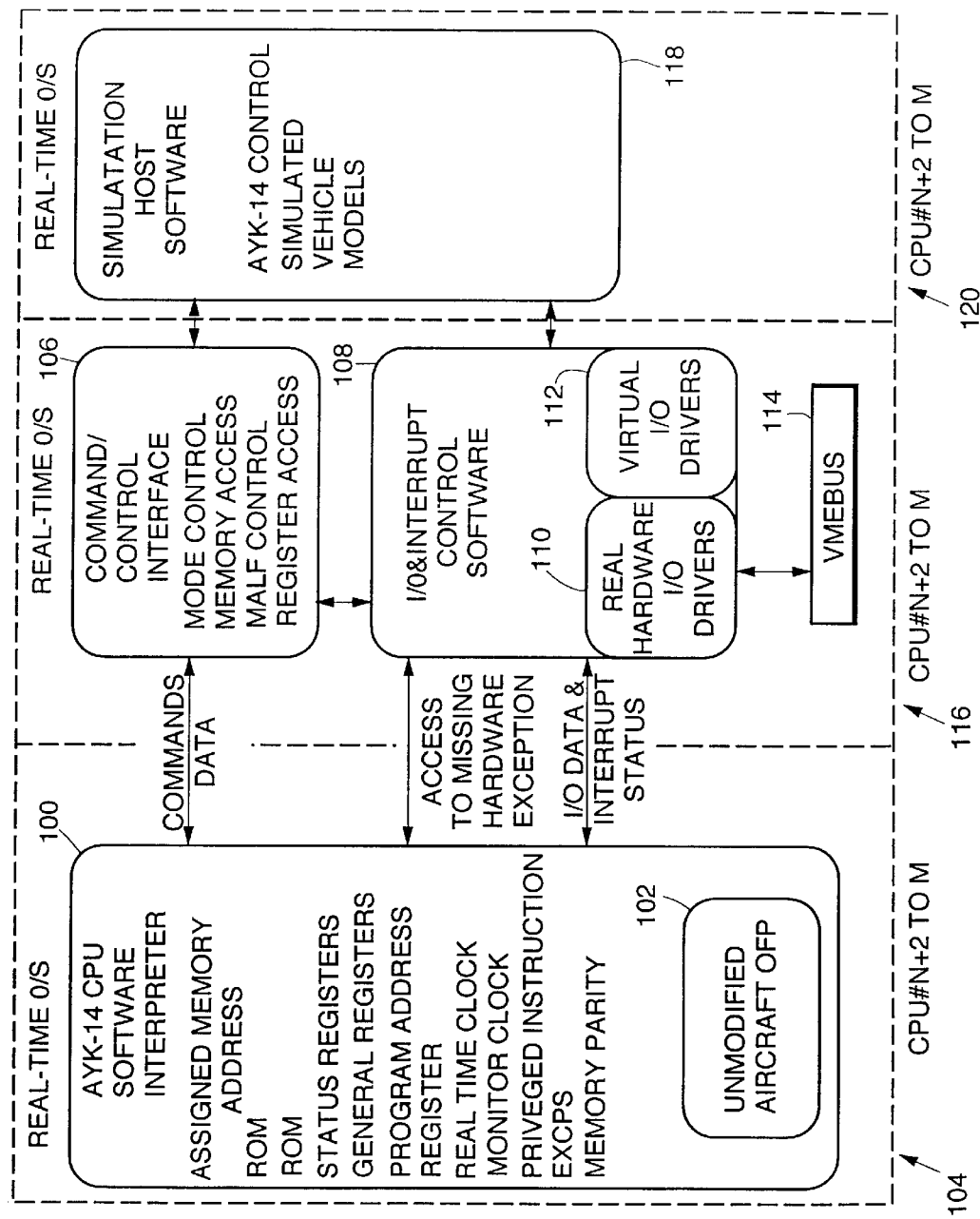
FIG. 6 is a detailed diagram of the control and data interaction between training and simulation host software and the software interpreter according to the present invention.

Referring now to FIG. 6, a detailed diagram of the control and data interaction between training and simulation host software and the software interpreter according to the present invention is shown. Software interpreter 100 represents one or more interpreters running concurrently to interpret corresponding instruction sets 102 of the unmodified aircraft OFP. As previously described, each software interpreter 100 runs as a shared process in a real-time operating system on a corresponding processor numbered 1 to N and indicated generally by reference numeral 104. Each software interpreter 100 implements assigned memory addresses, ROM, RAM, status registers, general registers, the program address register, real-time clock, monitor clock, and memory parity of the simulated avionic computer while also handling privileged instruction exceptions. All of the software interpreters 100 communicate commands and data to a common command/control interface 106 running on a single processor (N+1), indicated generally by reference numeral 116. In addition, each software interpreter 100 communicates I/O data and interrupt status to a common I/O & interrupt control 108 which also provides access to missing hardware exceptions generated by software interpreters 100.

With continuing reference to FIG. 6, I/O and Interrupt control software 108 may communicate with real hardware I/O drivers 110 or virtual I/O drivers 112. I/O and interrupt control software 108 provides "out-of-band" access to the software interpreter 100 (for simulator and trainer unique control functions) that is transparent to the executing aircraft OFP 102. Simulation host software 118 executing on another dedicated processor 120 can send and receive discrete serial module (DSM) and digital interface module (DIM) data via a virtual software buffer provided by the I/O control software 108. In addition, the I/O control software 108 can communicate directly to a bus (such as one complying with MIL-STD-1553B) and discrete I/O via VME bus 114 or the like with appropriate commercial I/O controllers attached. This feature allows for direct replacement of an avionic computer, such as the AYK-14, with a commercial platform, such as an SGI computer.

Figure 7:
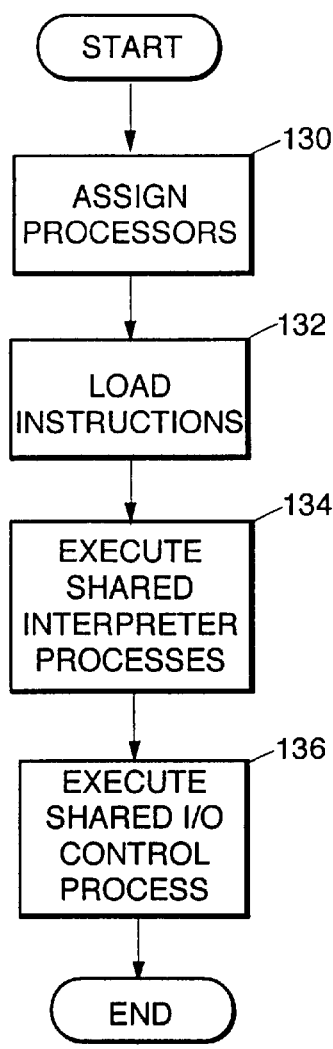
FIG. 7 is a flow chart illustrating a system and method for interpretation of avionic computer programs according to the present invention.

FIG. 7 is a flow chart illustrating a system and method for interpretation of avionic computer programs according to the present invention. It will be appreciated by one of ordinary skill in the art that the functions or steps illustrated do not necessarily require sequential operation but are illustrated sequentially for convenience only. As will also be appreciated, some functions and/or steps are preferably or necessarily performed concurrently.

Block 130 of FIG. 7 represents assigning or dedicating a single processor in a multiprocessor computer to execute each avionic computer instruction set. For example, in an AYK-14 which utilizes two processor modules each having a corresponding set of instructions comprising the OFP, one processor of the multiprocessing computer would be dedicated for each of the two processor modules. Block 132 represents loading or storing the set of instructions in cache memories associated with the processors of the multiprocessing computer. Block 134 represents executing a shared process on each of the processors which interprets the corresponding set of OFP instructions loaded into its associated cache memory. An additional shared process is executed on an additional processor as represented by block 136. In the above example, this would require a third processor of the multiprocessing computer. The additional shared process controls input/output and interrupt requests generated by each of the shared processes which are assigned or locked in step 130.

It is understood, of course, that while the forms of the invention herein shown and described include the best mode contemplated for carrying out the present invention, they are not intended to illustrate all possible forms thereof. It will also be understood that the words used are descriptive rather than limiting, and that various changes may be made without departing from the spirit or scope of the invention as claimed below.

What is claimed is:

1. A system for simulating, in real time, a real aircraft that has an avionic computer with a number of simultaneously running avionic computer processors, said number being at least two, said avionic computer processors each running a respective operational flight software program, said system comprising:

plurality of simulator processors equal in number to the number of the avionic computer processors in the avionic computer in the real aircraft, each of said simulator processors having a respective cache memory associated therewith in which a corresponding one of the operational flight software programs for the real aircraft avionic computer is loaded;

said simulator processor each having associated therewith respective interpreter software configured to interpret the corresponding operational flight software program so that said simulator processors are each able to run the corresponding operation flight software program from the real aircraft substantially as said corresponding operational flight software program is run in the avionic computer in the real aircraft being simulated;

said simulator processors each running corresponding operational flight software programs simultaneously in parallel using the interpreter software; and an instructions processor being operatively associated with the simulator processors, and controlling input/output activities or interrupts for said operational flight software programs running on the simulator processors.

2. The system as claimed in claim 1 wherein said operational flight software programs and said interpreter software are stored in contiguous cache memory locations.

3. The system as claimed in claim 1 wherein said instructions processor is in communication with a system bus module that is common to each of said simulator processors.

4. The system as claimed in claim 1 wherein each of said simulator processors communicates commands and data to said instructions processor and to a common I/O and interrupt control processor that is an additional shared process.

5. The system as claimed in claim 4 wherein said common I/O and interrupt control processor further comprises;

real hardware I/O drivers in communication with said simulator processors; and virtual I/O drivers in communication with said simulator processors for enabling simulator control functions.

6. The system as claimed in claim 1 further comprising an additional processor dedicated to simulation host software for sending and receiving data from said instructions processor.

7. The system as claimed in claim 1 wherein said instructions processor further comprises:

a system bus; and a plurality of commercial I/O controllers attached to said system bus, whereby said avionic flight computer can be interchanged with another computer platform.

8. The system as claimed in claim 1 wherein said cache memories further comprise a secondary cache in communication with said simulator processors through a shared memory process.

9. The system as claimed in claim 8 wherein said secondary cache is a line cache.

10. A method for simulating, in real time, a real aircraft that has an avionic computer with a number of simultaneously running avionic computer processors, said number being at least two, said avionic computer processors each running a respective operational flight software program, said method comprising:

providing a simulator computer having a plurality of simulator processors equal in number to the number of avionic computer processors in the avionic computer in the real aircraft, each of said simulator processors being mapped to a corresponding one of the avionic computer processors, and each having a respective cache memory in which the operational flight software programs associated with the corresponding avionic computer processor is loaded, and an instruction processor operatively associated with the simulator processors;

running each of the operational flight software programs from the real aircraft simultaneously in parallel in real time on a respective one of said simulator processors that corresponds to the avionic computer processor on which the operational flight software program runs in the avionic computer of the real aircraft that is being simulated using respective interpreter software configured to interpret the corresponding operational flight software program so that said simulator processors are each able to run the corresponding operation flight software program from the real aircraft substantially as said corresponding operational flight software program is run in the avionic computer in the real aircraft being simulated; and processing with said instructions processor input/output activities or interrupts for said operational flight programs running on the simulator processors.

11. The method as claimed in claim 10 wherein said operational flight software programs and said interpreter software are stored in contiguous cache memory locations.

12. The method as claimed in claim 10 wherein said instructions processor is in communication with a system bus module that is common to each of said simulator processors.

13. The method as claimed in claim 10 wherein each of said simulator processors communicates commands and data to said instructions processor and to a common I/O and interrupt control processor that is an additional shared process.

14. The method as claimed in claim 13 wherein said common I/O and interrupt control processor further comprises;

real hardware I/O drivers in communication with said simulator processors; and virtual I/O drivers in communication with said simulator processors for enabling simulator control functions.

15. The method as claimed in claim 10 wherein the simulator computer further comprises an additional processor dedicated to simulation host software for sending and receiving data from said instructions processor.

16. The method as claimed in claim 10 wherein said instructions processor further comprises:

a system bus; and a plurality of commercial I/O controllers attached to said system bus, whereby said avionic flight computer can be interchanged with another computer platform.

17. The method as claimed in claim 10 wherein said cache memories further comprise a secondary cache in communication with said simulator processors through a shared memory process.

18. The method as claimed in claim 17 wherein said secondary cache is a line cache.

19. A simulator system for simulating in real time a real aircraft that has an avionic computer, said simulator system comprising:

a plurality of simulator processors, each of said simulator processors corresponding to a respective avionic computer processor of the avionic computer, said avionic computer processors in the real aircraft each running a respective operational flight software program in parallel with the other avionic computer processors;

each of said simulator processors having operatively associated therewith a respective cache memory storing therein the operational flight software program used in the real aircraft for the avionic computer processor corresponding to said simulator processor;

said simulator processors each having associated therewith a respective stored interpreter software that enables said simulator processor to run the corresponding operation flight software program in the associated cache memory thereof;

said simulator processors running said operational flight software programs simultaneously in parallel using the interpreter software; and an instructions processor operatively associated with the simulator processors, instructions processor controlling input/output activities or interrupts for said operational flight software programs running on the simulator processors.

20. The system as claimed in claim 19 wherein said interpreter software is stored with the corresponding operational flight software program in the cache memory of the simulator processor associated therewith.

21. The system as claimed in claim 19 and further comprising a system bus module communicating with each of said simulator processors and said instructions processor.

22. The system as claimed in claim 19 wherein each of said simulator processors transmits commands and data to said instructions processor and to a common I/O and interrupt control processor shared among said simulator processors.

23. The system as claimed in claim 22 wherein said common I/O and interrupt control processor further comprises;

real hardware I/O drivers stored therein and in communication with said simulator processors; and virtual I/O drivers stored therein and in communication with said simulator processors for enabling simulator control functions.

24. The system as claimed in claim 19 further comprising an additional processor dedicated to simulation host software, said additional processor sending and receiving data from said instructions processor so as to provide real time interactive simulation of operation of the aircraft.

25. The system as claimed in claim 19 wherein said instructions processor further comprises:

a system bus; and a plurality of commercial I/O controllers attached to said system bus, whereby said simulator system computer can be interchanged among computer platforms.

26. The system as claimed in claim 19 wherein said cache memories further comprise a secondary cache in communication with said simulator processors through a shared memory process.

27. The system as claimed in claim 26 wherein said secondary cache is a line cache.

28. A method for simulating, in real time, a real aircraft that has an avionic computer, said method comprising:

providing a simulator computer having a plurality of simulator processors and an instruction processor operatively associated with the simulator processors, said simulator processors each corresponding to a respective avionic computer processor of the avionic computer that each in the real aircraft runs a respective operational flight software program in parallel with the other avionic computer processors;

storing in a respective cache memory of each of said simulator processors the operational flight software program used in the real aircraft for the corresponding avionic computer processor;

running each of the operational flight software programs from the real aircraft in real time in parallel on the simulator processors using respective interpreter software that enables each of said simulator processors to run the corresponding operation flight software program; and processing with said instructions processor input/output activities or interrupts for said operational flight programs running on the simulator processors.

29. The method as claimed in claim 28 wherein said interpreter software is stored in cache memory locations contiguous to said operational flight software programs.

30. The method as claimed in claim 28 wherein said instructions processor communicates with a system bus module that is common to each of said simulator processors.

31. The method as claimed in claim 28 wherein each of said simulator processors communicates commands and data to said instructions processor and to a common I/O and interrupt control processor shared among said simulator processors.

32. The method as claimed in claim 31 wherein said common I/O and interrupt control processor further comprises;

real hardware I/O drivers in communication with said simulator processors; and virtual I/O drivers in communication with said simulator processors for enabling simulator control functions.

33. The method as claimed in claim 28 wherein the simulator computer further comprises an additional processor, said additional processor operating with simulation host software and sending data to and receiving data from said instructions processor.

34. The method as claimed in claim 28 wherein said instructions processor further comprises:

a system bus; and a plurality of commercial I/O controllers attached to said system bus, whereby said simulation can be used interchangeably with different computer platforms.

35. The method as claimed in claim 28 wherein said cache memories further comprise a secondary cache in communication with said simulator processors through a shared memory process.

36. The method as claimed in claim 35 wherein said secondary cache is a line cache.

* * * * *